Sept. 17, 1935.    D. R. KAUTZ    2,014,767
DEVICE FOR REPRODUCING SOUND FROM FILM RECORDS
Filed Nov. 21, 1930
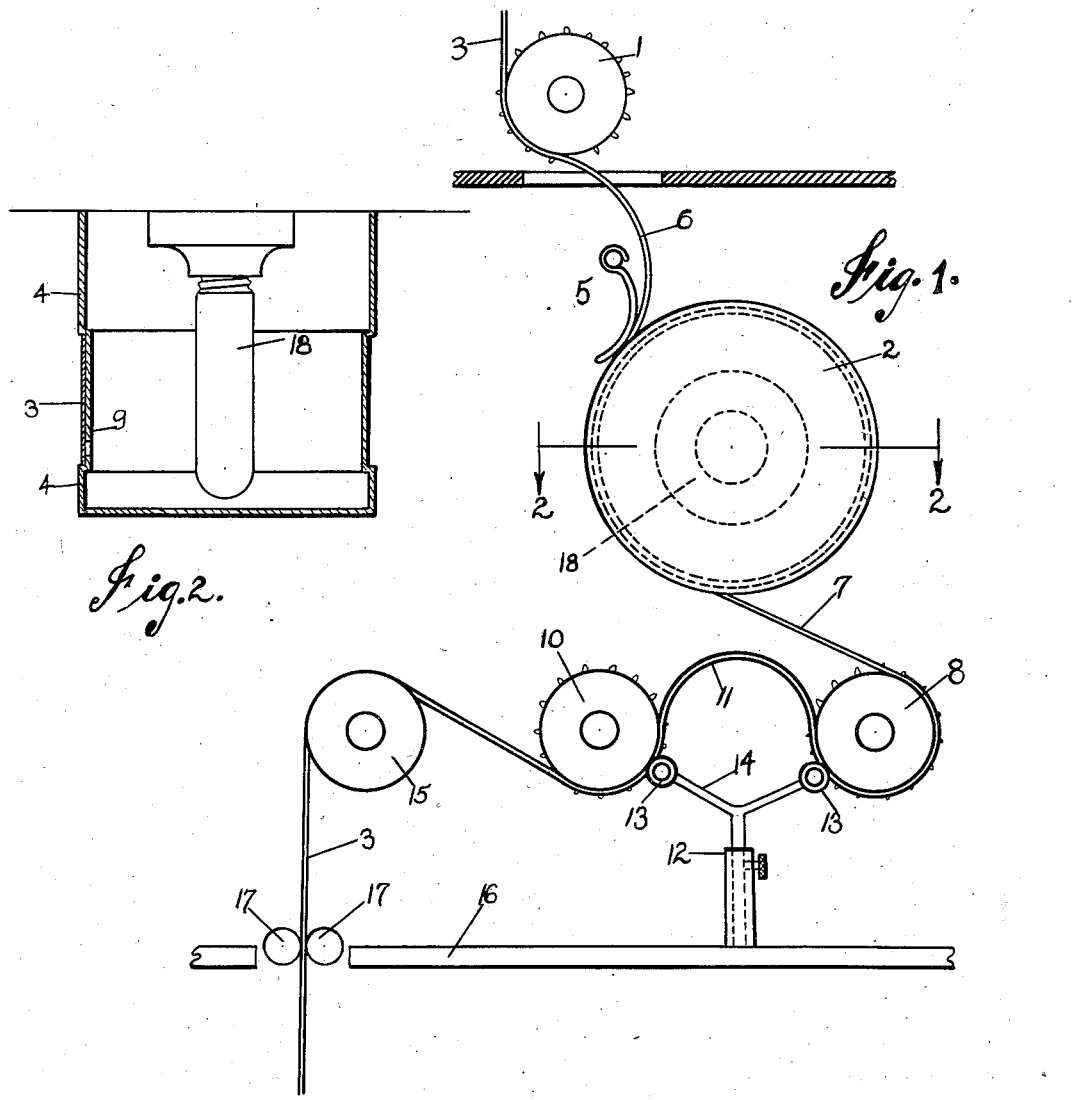

Patented Sept. 17, 1935

2,014,767

UNITED STATES PATENT OFFICE 2,014,767

DEVICE FOR REPRODUCING SOUND FROM FILM RECORDS

Delton R. Kautz, Norwood, Ohio, assignor to The Cincinnati Time Recorder Company, Cincinnati, Ohio, a corporation of Ohio Application November 21, 1930, Serial No. 497,256

4 Claims. (Cl. 179—100.3)

My invention is primarily addressed to devices for picking up and reproducing sound-on-film impressions in motion picture work. As is well known, sound is recorded on film upon a narrow strip closely adjacent the picture impression and between it and one of the lines of sprocket holes. The primary object of my invention is the provision of improved and simplified means for causing this narrow band of sound recording to have the desired action upon a photo-sensitive apparatus. Hitherto it has been the practice first to project upon the screen a visual image of the photographic image on the film and then to set the film in another part of the apparatus past a shielding device comprising a narrow slit having a length equivalent to the width of the sound record. This has been an awkward procedure inasmuch as it requires a considerable bulk of apparatus and in general a special source of light in a confined and shielded space acting upon the photo-sensitive apparatus through the aforementioned slit.

Another object of my invention is the provision of an arrangement of pickup mechanism which does away with the necessity for confining the light and under certain circumstances does away with the necessity for a separate light source. Still another object of my invention is the provision of means which offer as little resistance to the movement of the film as possible thereby cutting down wear on the film and prolonging its life.

These and other objects of my invention which will be set forth hereinafter or will be apparent to one skilled in the art, I accomplish by that certain construction and arrangement of parts of which I shall now describe a preferred embodiment, reference being had to the drawing which accompanies these specifications.

In the drawing:

Figure 1 is a semi-diagrammatic elevation of my apparatus.

Figure 2 shows the shield surrounding my photo-sensitive cell. It is a sectional view taken along the lines 2—2 in Fig. 1.

In the accomplishment of the objects of my invention, I provide merely a shield or housing surrounding a photo-sensitive cell or its equivalent, which shield cuts off generally all light from the said cell; but is provided with a narrow slit through which light may become effective thereon. The shield bears guides for the movement of the film and in my device I provide means for moving the film steadily past the housing or shield in which the photo-sensitive apparatus is placed. Thus the shielding of a light source per se becomes non-essential since the only shield necessary is that surrounding the photo-sensitive cell; and indeed in many cases I can so locate my sound pickup apparatus as to utilize the light of the projector for the sound pickup. In any event, I do not need to provide the light source with a shield or housing, with the accompanying development of heat in the parts, and I may in some instances do away with a separate light source entirely.

In Figure 1, I have indicated at 1 the final sprocket of a motion picture projection device and at 2 a fixed cylindrical housing in which my photo-sensitive device is placed. The film 3 is caused to move past this housing, and an examination of Figure 2 will show that the housing has upper and lower guiding members 4 between which the film rides and which serve to hold the film in position on the housing. Spring members 5 suitably attached to the frame of the device bear against the film as it rides about an arc of the surface of the cylindrical housing for the photo-sensitive cell. Between the sprocket 1 and the housing 2 there is a slack loop of the film indicated at 6, the spring fingers 5 serving to hold the film against the housing 2 and the friction of the film against the housing serving to maintain the slack loop 6. It will be noted that the film need traverse only a comparatively small arc of the surface of the housing and is pulled away in a straight line as at 7 by the power sprocket 8. This sprocket maintains the synchronism of the movement of the film past the slit 9 in the housing with the movement of the film through the projector. Since the film moves in a step by step manner through the projector and since this brings about certain irregularities of motion in the projector drive, I couple the projector drive to the power sprocket 8 through a suitable mechanical filtering device so that while synchronism is maintained, the driving motion of sprocket 8 is a smooth and regular motion so that the sound is not distorted.

A second driven sprocket 10 next engages the film which is maintained in a slack loop 11 between this sprocket and sprocket 8. An adjustable pin mounting 12 bears pad rollers 13 held by a spring 14 and designed to keep the sprocket holes of the film in mesh with the teeth of sprockets 8 and 10. The film may then be passed over a spool 15 and out of the frame or housing 16 through an orifice which is fitted with rollers 17.

It will now be seen that my device comprises essentially a photo-sensitive apparatus indicated in dotted lines at 18 inside a housing provided with a slit, and means to move a motion picture film past this slit. The simplicity of my device will at once be apparent together with the fact that the nature and position of the light source becomes unimportant provided sufficient light to operate the photo-sensitive apparatus impinges upon the slot through the film. Variations may be made in my device without departing from the spirit of my invention.

Having thus described by invention, what I claim as new and desire to secure by Letters Patent, is:—

1. In a sound pickup mechanism, a photo-sensitive device, a cylindrical non-rotative housing provided with a slit, closely surrounding said device, and means for moving a film steadily across and in contact with a substantial arc of the surface of said cylindrical housing which arc embraces said slit.

2. In a sound pickup mechanism, a photo-sensitive device, a cylindrical housing closely surrounding the same, said housing having a slit, guide means on said housing arranged to abut the edges of a film to prevent longitudinal displacement with respect to said slit, means for holding a film in contact with said housing and means for moving a film steadily past said housing around a substantial arc of the surface of said housing.

3. In a sound pick-up mechanism, a photo-sensitive device, a stationary, closed light-tight shell within which said device is located, said shell having a light aperture in a curved or arc-shaped surface thereof, means for moving a film around said curved surface, and means for maintaining a portion of said film in continuous alignment with said light aperture during said movement.

4. In a sound pick-up mechanism, a photo-sensitive device, a cylindrical, stationary, light-tight shell within which said device is located, said shell having a light aperture in a curved or arc-shaped surface thereof, means for moving a film around said curved surface, and means for maintaining a portion of said film in continuous alignment with said light aperture during said movement, said means comprising annular guiding means presenting shoulders lying in the plane of movement of said film and beyond the edges thereof.

DELTON R. KAUTZ.